Oct. 10, 1933. M. D. HANSON 1,929,816
PHOTOGRAPHIC BORDER PRINTING FRAME
Filed Sept. 6, 1932 3 Sheets-Sheet 1
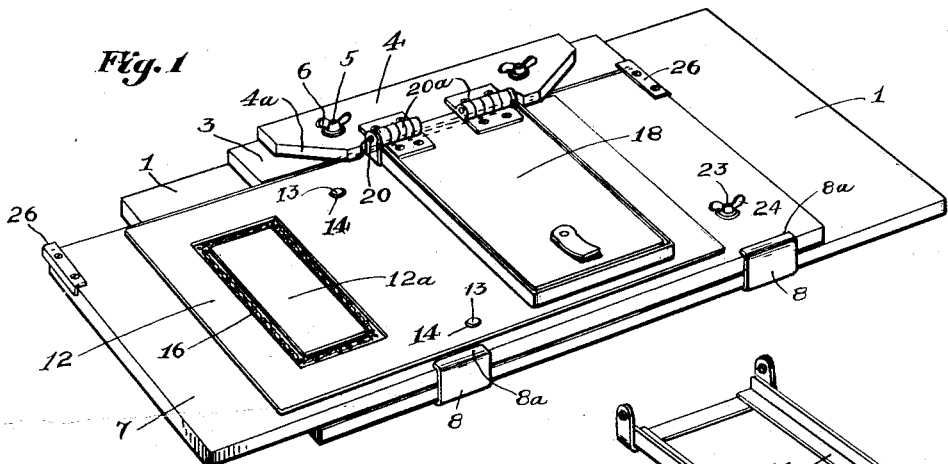
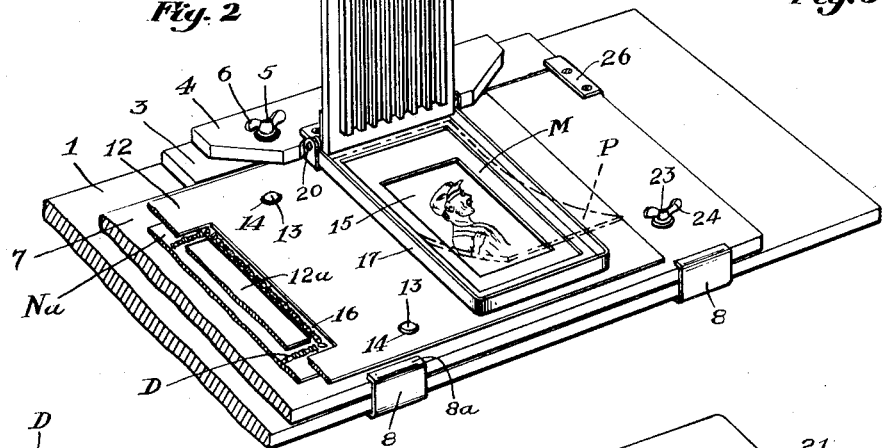
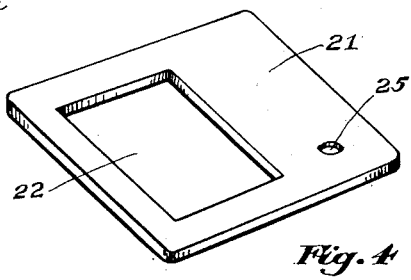
INVENTOR.
Maynard D. Hanson.
BY Henry L. Chenery.
Attorney.

Oct. 10, 1933.  M. D. HANSON  1,929,816
PHOTOGRAPHIC BORDER PRINTING FRAME
Filed Sept. 6, 1932    3 Sheets-Sheet 2
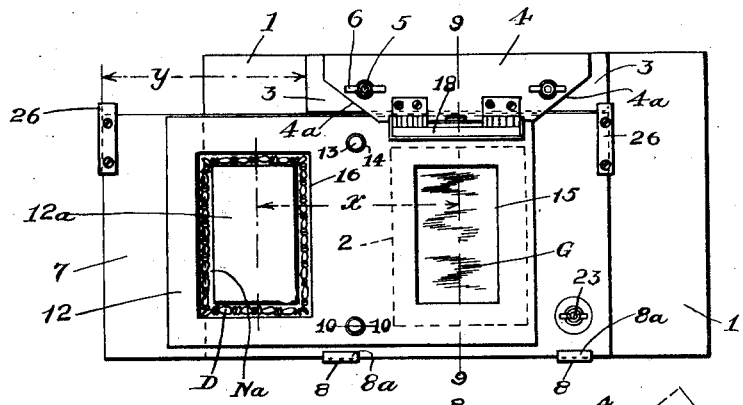
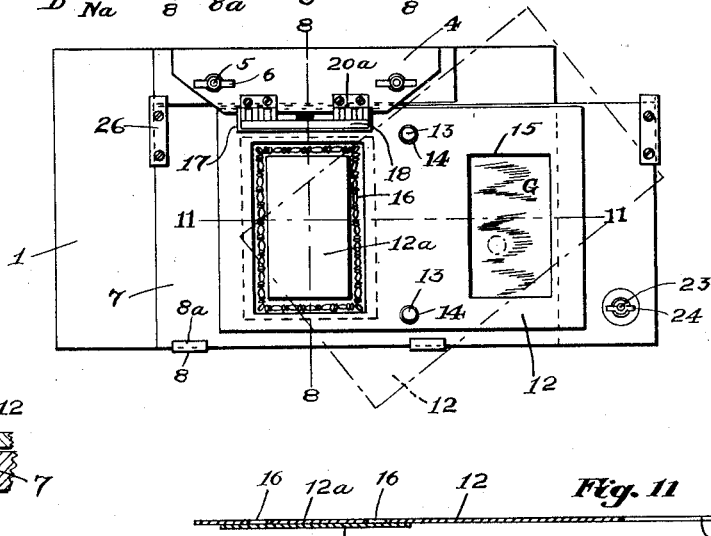
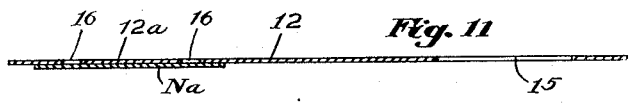
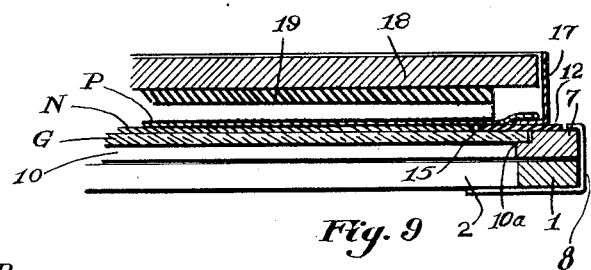
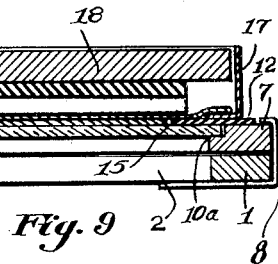
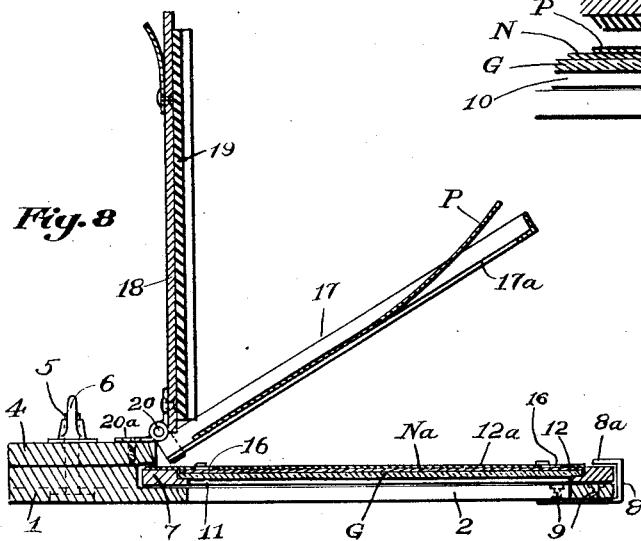
INVENTOR.
Maynard D. Hanson
BY Henry L. Chenery,
Attorney.

Oct. 10, 1933.  M. D. HANSON  1,929,816
PHOTOGRAPHIC BORDER PRINTING FRAME
Filed Sept. 6, 1932  3 Sheets-Sheet 3
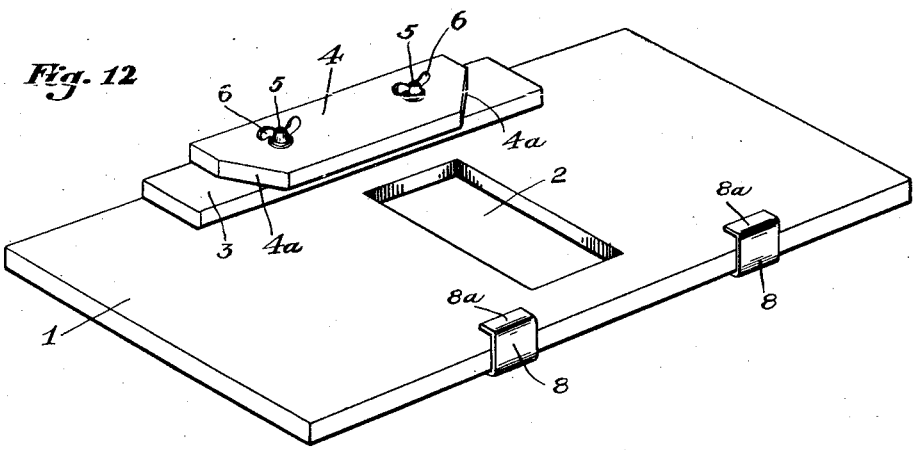
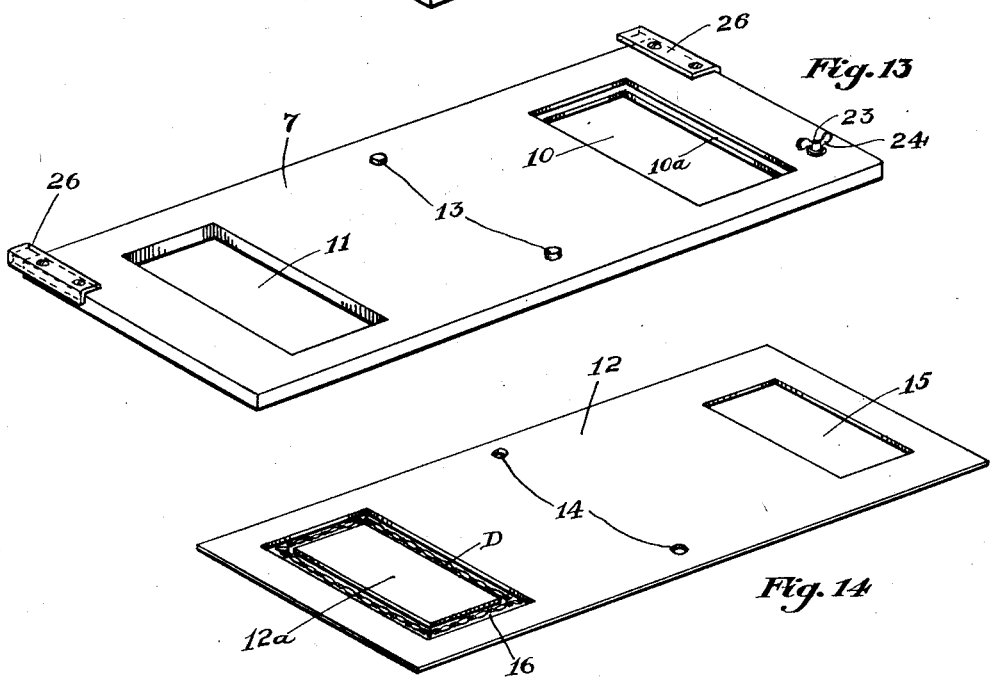
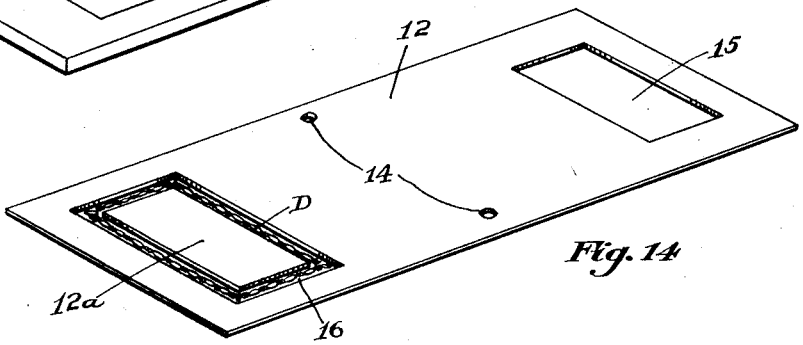
INVENTOR.
Maynard D. Hanson.
By Henry L. Chenery,
Attorney.

Patented Oct. 10, 1933

1,929,816

UNITED STATES PATENT OFFICE 1,929,816

PHOTOGRAPHIC BORDER-PRINTING FRAME

Maynard D. Hanson, Portland, Maine

Application September 6, 1932. Serial No. 631,747

4 Claims. (Cl. 95—73)

The invention hereinafter to be described relates to improvements in photographic printing frames, particularly those adapted to serve the amateur photographer for double printing purposes, as for instance, where the finished print is to include the main picture and some fanciful border design.

I have sought in my present invention to construct a printing frame which, in operation, requires no painstaking effort to procure accurate registration of the print paper when shifting it from one exposure-position to the other.

The base-board of the frame carries a slide in which are two openings through which the two exposures of the print paper to a strong printing light is effected, the first exposure being of the general subject of the negative from which the photographic print is to be taken, and the other exposure the marginal reproduction which may be of any particular design desired.

The effectiveness and artistry of double or border printing is greatly enhanced by being done accurately with respect to parallelism of the marginal lines and exposed surfaces, and in the construction of my printing frame this requirement has been considered of first importance.

The slide has two dowels projecting from its upper surface and these engage holes in a one-piece mask which prevents its disarrangement while making the double exposures.

Stops at each end of the slide member confine its extreme longitudinal movements to within fixed limits and facilities are provided for printing either from film or glass negatives, and from various sizes of either by interchangeable masks having openings corresponding to the particular size of finished print desired.

No adjustments are required to be made in operating my printing frame. The masks are prepared ready to be used by the photographer, the openings cut to accurate size, avoiding the tiresome and slow method heretofore largely resorted to of pasting strips of paper on the borders of the openings to obtain the proper sizes—which method seldom accomplishes the desired result.

The frame is light, can be used with artificial or sun light, is constructed in a substantial manner and its operation simple in the extreme.

The character of the invention may best be understood by reference to the description found in the following specification when taken in connection with the accompanying drawings disclosing one embodiment which, at the present time, I consider preferable to other possible forms in which the invention might be carried out.

In the drawings:

Fig. 1 is a perspective view of my printing frame, the print paper carrier cover being lowered;

Fig. 2 is a fragmentary view of Fig. 1, the cover being raised;

Fig. 3 is a perspective of the paper-carrier frame;

Fig. 4 is a perspective of the glass negative carrier;

Fig. 5 is a view illustrative of the object of the invention;

Fig. 6 and Fig. 7 are plan views of the printing frame showing, respectively, the first and second exposure positions of the slide member;

Fig. 8 is a section on line 8—8, Fig. 7;

Fig. 9 is a fragmentary section, to an enlarged scale, taken on line 9—9, Fig. 6;

Fig. 10 is a section taken on line 10—10, Fig. 6;

Fig. 11 is a section taken on line 11—11, Fig. 7;

Fig. 12 is a perspectitve of the base-board;

Fig. 13 is a perspective of the slide member, and

Fig. 14 is a perspective of the mask.

Similar reference characters are employed to identify like parts in all views of the drawings.

Referring to the drawings, 1 represents the base-board of my printing frame which when in actual service may be and ordinarily is mounted on a box in which artificial light is employed for photo-printing purposes.

Through the base-board is one large opening 2, disposed centrally of the length of the board, and on its top, at one side, is a raised portion 3 detachably mounted on which is a cleat 4 secured by screws 5 and wing nuts 6. The cleat projects inwardly over the edge of the raised portion and its corners are cut away, as at 4a, for a purpose hereinafter to be explained.

Longitudinally movable on the top of the base-board is a slide member 7 having a thickness corresponding to that of the raised portion 3—the upper surfaces of the two members, 3 and 7, being flush, with their adjacent edges slidably abutting.

On the side of the base-board opposite the portion 3 are two clips 8, secured to the base-board by rivets 9. The upper ends of these clips are bent inwardly, as at 8a, overhanging the slide member when assembled on the board.

Thus, as the cleat extends over the top of the slide member on one of its sides and the clips serve in a similar capacity on its opposite side, the slide travels in a slide-way and may be moved forwardly and backwardly on the base-board and be held, by means, against lateral and vertical displacement from off the board.

In the slide member are two openings, 10 and 11, the former having a rabbeted edge 10a on which rests a glass pane G.

A mask 12 surmounts the slide member and is detachably secured thereto by means of dowels 13 secured in the slide, the dowels engaging holes 14 in the mask.

The mask has two openings, 15 and 16, the longitudinal center distance between which is similar to that between the two openings 10 and 11 of the slide member. The film negative from which prints are to be made is inserted in the opening 15 and is supported therein on the glass plate G in the slide member.

In one extreme position of the slide member the mask opening 15 comes into alignment with the print paper carrier, the frame 17 of which is shown in detail in Fig. 3.

The carrier frame is provided with an inturned flange 17a which supports the extreme edges or margins of the print paper. The cover 18, on the inner face of which is mounted a rubber, ribbed mat 19, is swung down on to the print paper, the rubber providing a resilient pressure on the paper and bringing all portions of its surface into intimate contact with the negative. The frame and cover both swing from pivot pins 20 common to both, the ends of the pins extending outwardly from the hinges 20a to engage the carrier frame ears.

By reference to Fig. 2, in which is shown in dot and dash lines the representation of a sheet of print paper being inserted in the carrier frame, it will be observed that a considerable margin M on the print paper will remain unexposed to the light after the completion of the first printing operation conducted through the opening 15 of the mask. The area exposed corresponds to that included within the lines L, L, Fig. 5 which, in reality, is just the size of the opening 15.

After the first or main exposure has been made the carrier is swung upwardly, raising the paper off the negative N. The slide member is then advanced to its other extreme position bringing the opening 16 in the mask into central alignment with the opening 2 in the base-board and also centrally of the paper carrier frame 17.

The opening 16 is partially covered by an inner, auxiliary mask 12a the area of which is exactly that of the opening 15. The space between the mask 12a and the opening 16 forms a gnomon which is represented, in Fig. 5, by the surface outside the lines L, L. Within and around this space the border design D is transferred to the print in the second exposure operation.

If reference be had to Fig. 11 it will be noted that on the under side of the mask 12 is a thin film, constituting a negative of the particular design which it is desired to incorporate in the picture as the border adornment—such, for instance, as the design D in Fig. 5. The film or negative Na overlaps the opening 16 and is adhesively secured to the mask 12. Likewise the mask 12a is secured to the upper side of the member Na.

A double printing operation is thus accomplished by first blocking off the surface of the paper print from the effects of the light rays by the mask around the opening 15, leaving unexposed the surface corresponding to that lying outwardly of the lines L, L, Fig. 5, and then by employing the other opening in the mask 12 performing the second exposure operation by protecting the surface already exposed by covering it with the mask 12a while the border reproduction from the negative Na is transferred to the previously unexposed portion of the print paper.

It will be understood, of course, that other shapes than rectangular may be similarly employed for the mask openings.

While in a majority of cases the main negative representative of the subject matter of the picture will be a film, in some instances it will be desirable to print from a glass negative. For this latter purpose I provide a special holder 21 having an opening 22 to receive the negative. The holder is secured on the slide member by means of the screw 23 and wing nut 24, the hole 25 being considerably larger than the screw to permit of slight adjustments in positioning the holder on the slide member.

In order to gauge the longitudinal movements of the slide so that the transverse center lines through the openings in the mask will accurately align with the paper carrier in the two printing operations, stop members 26 are provided at each end of the slide member, the stops abutting, respectively, on the ends of the raised portion 3.

It is frequently desired to print pictures either from various sizes of negatives or to mask the negatives to produce smaller sizes of prints. All that it is necessary to do is to remove the mask 12 and replace with one equipped with the proper sizes of openings.

As I preferably construct my printing frame the mask member extends laterally on one side beneath the overhanging cleat 4, so that this side of the mask, at least, is prevented from rising off the dowel which horizontally positions it. But if it becomes necessary to remove it for the purpose of replacing with another it is accomplished in this manner: First lift the mask from the dowel on the side of the frame opposite to that on which is the cleat, then revolve it until it is clear of the cleat, in which position it may easily be lifted from the second dowel— the position of the mask when about to be removed from the slide member being shown in dot and dash lines in Fig. 7. The reason for cutting off the corners of the cleat at 4a thus becomes obvious.

In the removal of the slide member from the base-board the wing nuts 6 are unscrewed from the screws 5 and the cleat 4 taken off the baseboard; the edge of the slide member adjacent the cleat is lifted clear of the raised portion 3 then moved laterally until it is disengaged from the clips 8.

Another function exercised by the wing nuts 6 relates to their capacity to slightly release the cleat from the raised portion 3 in order to permit the insertion of the glass negative frame 21 beneath the paper carrier frame 17, particularly when the plates are abnormally thick.

Utmost care is exercised in constructing the printing frame to insure accurate gauging of the openings with respect to the stop members 26. For instance, the dimension "$x$", or the center to center distance between the two openings in the mask, must be identical with the dimension "$y$", the full longitudinal travel of the slide member. By employing positive, non-adjustable stops the operator is always sure of accurate registration and the inclination to tamper with devices permitting variation in the travel of the slide member obviously eliminated.

It is confidently believed that by using my improved photographic border printing frame, commercial as well as amateur photographers can accomplish results not attainable by ordinary, conventional methods.

What I claim is:

1. A photographic border printing frame comprising a base-board having a longitudinally central opening therein, a slide member, having two openings therein, operable on said base-board, a main mask having two printing apertures in central, longitudinal alignment, respectively, with the two openings in said slide member, an auxiliary mask positioned within one of the openings in said main mask, leaving an intervening space all around, between the two masks, means to secure said slide member against lateral and vertical displacement from said base-board, a print-paper carrier hingedly secured on said base-board and operable, in central alignment, over the opening therein, stops restricting the longitudinal movement of said slide member in both directions, an auxiliary negative holder, and means whereby said auxiliary negative holder may be adjustably secured on and to said slide member.

2. A two-operation printing frame adapted for use in photographic border printing work, comprising a base-board having an opening therethrough, a slide member reciprocably mounted on said base-board, said member having two openings which, successively, are adapted to be brought into register with the opening in said base-board, a mask demountably secured on the top of said slide member and having two printing apertures therein for use in primary and secondary printing operations, respectively, one of said apertures being adapted to permit of the central portion, only, of the print paper sheet being exposed to the light while the marginal portions are protected therefrom, and the other of the two apertures being adapted to allow exposure of the paper over its border or marginal portions while the already exposed portion is protected, a stop on each end of said slide member adapted to bring, successively, each of the said apertures in said mask into central alignment with the opening in said base-board, a print-paper carrier frame hinged at one of its ends to said base-board and disposed in central longitudinal alignment with the opening therein, said frame having an inturned flange adapted to support the print-paper, and a cover having a resilient inner face hingedly mounted on said carrier frame.

3. In a photographic, two-operation printing frame the combination of a base-board having an opening therein, a raised portion on one side thereof, a cleat demountably secured on said raised portion and projecting inwardly beyond the edge thereof, said cleat having its two inner corners cut away obliquely, a slide member, having two openings relatively spaced, longitudinally of said member, reciprocally mounted on said base-board, one edge of said member abutting the inner edge of said raised portion and movable therealong, beneath the overhanging portion of said cleat, and the opposite edge of said member disposed flush with the adjacent edge of said base-board, clips secured to said base-board and extending upwardly and inwardly over the flush edge of said slide member securing the latter against vertical displacement from said base-board, dowels secured in said slide member, a mask disposed on said slide member, having two printing openings centrally aligning respectively, with the two openings in said slide member, said mask being further provided with dowel holes adapted to engage said dowels for the purpose of accurately positioning said mask on said slide member, a print-paper carrier hingedly mounted on said cleat and adapted to swing from a position in which it is in contact with said mask to a vertical position, and means whereby said slide member may be definitely and accurately stopped at the end of its extreme movements with either one or the other of the two openings therein in central, longitudinal alignment with the opening in said base-member.

4. In a device of the character described comprising a base-board having an opening therein, a slide member longitudinally movable on said base-board and having two openings adapted, when said member is reciprocated, to be brought successively into central registration with the opening in said base-board, a main mask detachably secured to and disposed on the top of said slide member, said mask being provided with two dissimilar size openings the center to center distance between which corresponds to that between the two openings in said slide member, an auxiliary mask disposed within the larger of the two main mask openings and of a size similar to the smaller of the two, said auxiliary mask being so positioned that a space on all sides intervenes between its edges and those of the main mask opening, a print paper carrier hingedly connected to said base-board in central alignment with the opening therein, and means to limit the movement of said slide member in all directions.

MAYNARD D. HANSON.